E. A. HEWITT.
COW MILKER.

No. 111,932.    Patented Feb. 21, 1871

Witnesses:
Chas. E. Warren
Frank L. Mathews

Inventor.
E. A. Hewitt
By atty.
J. W. McIntire

United States Patent Office.

ELISHA A. HEWITT, OF GROTON, CONNECTICUT.

Letters Patent No. 111,932, dated February 21, 1871.

IMPROVEMENT IN COW-MILKERS.

The Schedule referred to in these Letters Patent and making part of the same.

*To all whom it may concern:*

Be it known that I, ELISHA A. HEWITT, of Groton, of New London county, in the State of Connecticut, have invented certain new and useful Improvements in Cow-Milkers; and I do hereby declare that the following is a full and exact description thereof, reference being had to the accompanying drawing making part of this application.

Previous to my invention a variety of appliances have been suggested and employed for the purpose of drawing off the milk from the bag of the cow, most of which apparatus have been constructed so as to effect the extraction of the milk by the use of an air-pump.

Some of the machines used are adapted to be used for milking simultaneously any number of cows.

In all of the machines that I know of there is considerable expense involved, and the necessary complication consequent to the use of a pumping or air-exhausting system.

I propose to dispense with the air-exhausting system, and all consequent expense and complication of mechanism, and at the same time afford a means for mechanically and automatically milking one or more cows, which shall possess all the advantages of successful operation now embodied in the best known but expensive and complex machines, and which shall require in its use little or no manual labor; and to these ends My invention consists in the employment of a series of flexible tubes or conduits, which converge into one main tube or conductor, and which are provided with metallic or other suitable teats, adapted to be inserted into the cow's teats, and operating as hereinafter more fully explained.

And my invention further consists in having the teat-pieces formed or provided with a projection which will enter the teat of the cow in such manner as to effect the retention in the latter of the teat-piece, as hereinafter more fully explained.

And my invention further consists in making the tubes which enter the cow's teat variable in length, so that they be adapted to different teats, as hereinafter fully explained.

To enable those skilled in the art to make and use my invention, I will proceed to more fully describe my "improved cow-milking contrivance," referring by letters to the accompanying drawing, in which—

In the several figures the same part is designated by the same letter of reference.

$a\ b\ c\ d$ are the teat-pieces or the tubes, which are inserted within the cow's teat. They are made of metal or other suitably-rigid material, of about the form shown, and are attached to flexible tubes $e\ f\ g\ h$, which converge into a main conduit or tube, I, from which the milk is discharged into any desired receptacle.

Each of the teat-pieces $a$, &c., is provided with a collar, $k$, which serves as a stop, coming against the end of the cow's teat when the tube is inserted, to prevent the tube $a$ from entering too far into, and hurting the teat of the cow; and just above the said collar $k$ is formed or provided a small protuberance or bulge, $i$, the object and effect of which is to prevent the tube $a$ from easily escaping from or dropping out of the teat after it has been inserted, as will be more fully explained presently.

Each of the tubes $a\ b\ c$, &c., is made variable or adjustable as to length, as shown, being made in parts, something after the fashion of a telescope, so that it may be adjusted or made longer or shorter, to adapt it for use with cows having longer or shorter teats, or teats of different anatomical construction.

Each of the teat-pieces $a\ b$, &c., is formed with a conical, closed, and smooth end, so that it can be readily inserted into the cow's teat without pain; and just below the end are several perforations or side holes 1 2, &c., through which the milk can freely flow to the interior of said tubes, and thence out into the flexible conduits $e\ f$, &c.

Figure 1:
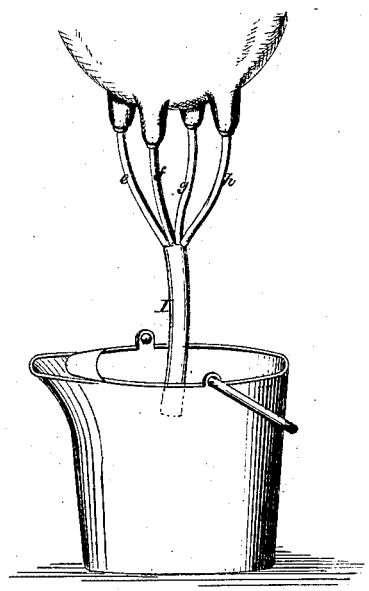
Figure 1 is a view showing the application of the apparatus to the teats of a cow.
Figure 2:
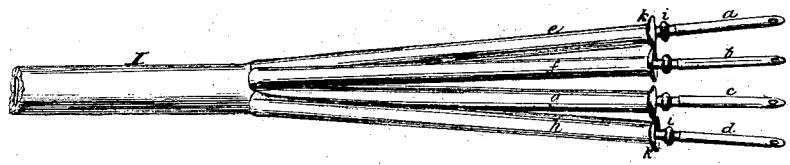
Figure 2 is an elevation (increased scale) of the apparatus.
Figure 3:
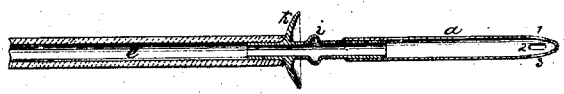
Figure 3 is a section of one of the teat-pieces or tubes.

When the apparatus is to be used, the tubes or teat-pieces $a\ b\ c\ d$ are inserted in the cow's teats, as illustrated at fig. 1, and the main conduit or leader I placed over the bucket or other receptacle, into which the milk is to be drawn. The milk contained in the cow's bag will flow through the inserted tubes $a\ b$, &c., passing in at the side openings 1 2, &c.; thence through the flexible tubes $e\ f\ g\ h$ into the main conduit I, from whence it flows to the receptacle designed to catch and hold it.

It will be seen that with the teats $a$, &c., attached to a series of flexible tubes, $e\ f$, &c., converging into one main tube I, the milk from all the teats of the cow, no matter how the latter may hang, can be easily gathered into and discharged from a single tube, and that this operation can continue without difficulty while the cow is moving or slightly changes her position. All that it is necessary for the operator to do is, to keep the mouth of the exit tube I over the receptacle.

By having a slight bulge or protuberance on the tube $a$, as shown and described, the extreme end of the cow's teat is allowed to clasp the tube $a$ below said protuberance, after it is forced in, and the protuberance then prevents the tube $a$ from coming out too easily, (or except by being pulled out by the operative.)

As the teats of cows, and even teats on the same cow, vary in size and formation, it is essential that any instrument inserted should be adapted to the size and formation of the teat. I have, therefore, made each tube so that its length may be varied, as shown and described.

When the tubes are inserted in the teats, all the milk, except the minute quantity which rests in the end of the teat below the orifices 1 2, &c., in the cow's bag will run out, and the cow will be quickly milked without any manual labor, and it will be seen that no complication of working mechanism or mechanical parts is embodied in the apparatus employed.

Of course a series of sets of teat-tubes may be combined at suitable distances apart, with one main conduit I, in such a manner that a number of cows may be milked simultaneously, and all the milk discharged into one general receptacle.

And it will be understood that the several features of my invention may be carried out by detail constructions of the parts varying somewhat from those shown, without departing from the spirit of my invention.

Having explain the several parts of my improved cow-milker, so that those skilled in the art can make and use the same,

What I claim as new, and desire to secure by Letters Patent, is—

1. The arrangement of the teat-pieces having the stationary stop-collar and bulge, with the series of flexible tubes and main conduit, as and for the purposes set forth.

2. In combination with the stationary stop and bulge, the adjustable or variable tubes to enter the teat of the cow more or less, as described.

In testimony whereof I have hereunto set my hand and seal this 28th day of September, 1870.

ELISHA A. HEWITT. [L. S.]

Witnesses:
  J. McINTIRE,
  HORACE SMITH.